United States Patent Office 3,781,366
Patented Dec. 25, 1973

---

3,781,366
PREPARATION OF α-DITHIOLS
Alain Pfister and Emmanuel Arretz, Pau, and Alain Donche, Lescar, France, assignors to Societe Nationale des Petroles d'Aquitaine tour Aquitaine, Courbevoie, France
No Drawing. Filed Aug. 27, 1971, Ser. No. 175,754
Claims priority, application France, Aug. 31, 1970, 7031660
Int. Cl. C07c *149/06*
U.S. Cl. 260—609 R        10 Claims

ABSTRACT OF THE DISCLOSURE

A process for producing α-dithiols with the general formula:

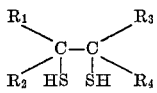

in which $R_1$, $R_2$, $R_3$ and $R_4$, identical or different, can each be either hydrogen or alkyl radicals such as methyl, ethyl, propyl, possibly substituted by halogen, thiol or hydroxyl groups is disclosed.

This process consists in causing a reaction to occur between an organic ester of a 2-mercaptoalkyl and an alkaline sulphydrate in an aqueous solution in the absence of an organic solvent at temperatures ranging between 50° C. and 160° C., and recovering by decantation the dithiol constituting the organic layer.

The α-dithiols are used in polymerization reactions. They are adducts on double bonds, and are used in the fields of insecticides, pesticides, and fungicides.

---

The present invention concerns a process for producing α-dithiols with the general formula:

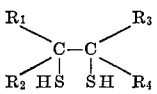

in which $R_1$, $R_2$, $R_3$ and $R_4$, indentical or different, are hydrogen or alkyl radicals such as methyl, ethyl, propyl, a.s.o., possibly substituted by halogen, thiol or hydroxyl groups.

The dithiols of this invention are highly valuable for industry; they can be used for the same purpose as the 1,2-glycols, can replace dialcohols in polymerization reactions and may be used as adducts on double bonds. They are used as starting materials for the synthesis of insecticides and pesticides. They are also synthetic intermediates, making it possible to produce the 2-imino- and 2-ylideno - 1,3 - dithiolanes, or to transform a carbonyl group (CO) into a methylene group ($CH_2$) by passing through cyclic acetaldithiol and hydrogenation.

The α-dithiols are known products, as are some of their methods of preparation. For example, a method is known whereby the α-dithiols are produced via a reaction between the corresponding halogenated derivative and thiourea (Org. Synth., vol. 30, pp. 35–37). A diisothiouronium salt is obtained as an intermediate product, which is hydrolyzed in an alkaline medium into a dimercaptan, which is then acidified to obtain a dithiol. But this method is time consuming and hard to implement industrially. The yield of the hydrolysis operation is poor. Furthermore, what is obtained is not exclusively α-dithiols but also a high proportion of trithioglycol, which reduces the dithiol yield to a corresponding extent. According to another embodiment of this process, the thiourea is replaced by an alcoholic solution of sodium or potassium sulphydrate, but the difficulties remain unchanged.

A process is also known (U.S. Pat. 3,043,880) whereby ethane dithiol is prepared from mercaptoethyl carbonate. This process consists of treating the mercaptoethyl carbonate with a methanolic solution of ammonium hydroxide saturated with $H_2S$ at a temperature of from $-5°$ C. to $+5°$ C. The $H_2S$ is added continuously for two hours, and the reaction mixture, kept at 25° C., is stirred continuously for 20 hours. The mixture is cooled to 0° C., and is then acidified with concentrated hydrochloric acid. The dithiol is extracted by an organic solvent. After distillation of the solvent, the dithiol is recovered. The yield of α-dithiol is about 70%. By this same process there can also be obtained relatively substantial amounts of mercaptoalcohols (5 to 10%), which are extremely hard to separate from the α-dithiols by distillation. It is clear that the known processes are time-consuming and that the starting materials used are scarce and expensive. The known processes are therefore uneconomic.

The applicants on behalf of U.S. Pat. 3,043,880 have tried to modify this process by using as a starting material mercaptoethyl acetate instead of mercaptoethyl carbonate. However, the results were extremely poor. The yield of ethane dithiol was 16%; a substantial amount of the mercaptoethyl acetate remained unchanged, and, during the distillation process, fractions were obtained that displayed an imprecisely defined boiling point.

French Pat. 1,431,717 describes a process for the preparation of α-dithiols. This consists in submitting a 1,3-oxathiolane-2-one to the combined action of a base and $H_2S$. A certain number of intermediate products are formed, and the dithiol is finally obtained with a yield of 62% with respect to the starting oxathiolane used.

The present process represents a substantial improvement over those previously described. However, with this process, in order to obtain yields greater than 60%, it is necessary to operate with molar ratios of alkaline sulphydrate to oxathiolane-one higher than 5. If lower ratios are used, substantial amounts of by-products are obtained such as, for instance, 2-hydroxyethyl sulphide (or thiodiglycol); 2-mercaptoethyl sulphide (or trithiodiglycol); and 2-mercaptoethyl- and 2'-hydroxyethyl sulphides.

It has been possible to achieve a definite improvement in the production of α-dithiols by means of a new process that is both easy to implement and highly simplified as compared to previous processes. This new process uses readily obtainable and economical starting materials. In addition, the α-dithiol yield is in the neighborhood of 85%, representing a tremendous improvement over previous results.

The process according to the present invention is characterized by the fact that an organic ester of 2-mercaptoethyl, which can be substituted in position 1 and/or 2, is made to react with an aqueous solution of an alkaline sulphydrate at temperatures ranging from 50° C. to 100° C., and that the organic layer constituted by dithiol is recovered by simple decantation.

The organic ester possesses the formula:

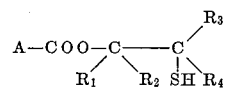

in which A represents an aliphatic hydrocarbon radical containing from one to six carbon atoms. A preferred form of the process according to the invention consists in using a 2-mercaptoalkyl acetate. The radicals $R_1$, $R_2$, $R_3$ and $R_4$ have the same significance as above.

The mercaptoalkyl acetates can be obtained by various processes. They can be obtained by the acetylation of the 2-mercaptoalcohols, which themselves are prepared by the action of hydrogen sulphide on the corresponding epoxides. This acetylation by acetic acid or acetic anhydride is a quantitative reaction. 2-mercaptoethyl acetate can also be obtained economically via the photocatalyzed addition of hydrogen sulphide on vinyl acetate.

The aqueous solution of alkaline sulphydrate (sodium, ammonium, or potassium sulphydrate) is obtained by saturating an alkaline aqueous solution with a stream of hydrogen sulphide. Ammonium sulphydrate is used in preference to the other alkaline sulphydrates, because it can be prepared from more concentrated aqueous solutions of the corresponding base (a solution whose density may reach 0.90 may be used).

In accordance with one preferred form of the invention (a form that makes it possible to still further improve the yield of α-dithiol) an excess of hydrogen sulphide is added to the reaction mixture.

The process can be carried out as follows: The ester of a 2-mercaptoalkyl and the aqueous solution of alkaline sulphydrate are introduced into a reactor. The reaction mixture is held at a temperature between 50° C. and 100° C. and is stirred continuously. As described above, it is also possible to feed an additional amount of $H_2S$ into the reactor either at the onset of the reaction or while the reaction is occurring. At the end of the reaction, an organic layer, constituted of over 96% pure dithiol, is recovered by simple decantation.

A preferred method of carrying out the process involves the use of an autoclave so as to prevent the decomposition of the sulphydrate at the operating temperature. The procedure is as follows: The 2-mercaptoalkyl ester and the specified quantity of concentrated ammonium hydroxide are introduced into the autoclave. The latter is closed and liquid $H_2S$ is pumped in. To the quantity required to transform the ammonium hydroxide into sulphydrate is added an excess of $H_2S$ comprising between 0.1 and 100%. The autoclave, under stirring, is heated to a temperature of between 50° C. and 150° C. The temperature depends on the starting materials and the products to be obtained, but should preferably be between 75° C. and 100° C. When the reaction is complete, the organic layer constituted of dithiol is recovered by simple decantation. The reaction can be carried out using the stoichiometric quantity of alkaline sulphydrate and 2-mercaptoalkyl ester, but the dithiol yield has been seen to improve if the operation is carried out in the presence of an excess of alkaline sulphydrate. The molar ratios of alkaline sulphydrate to ester of 2-mercaptoalkyl vary between 1.5 and 4. A ratio of 2 or 3 provides an excellent yield.

Reaction time is generally from one to three hours. For a given product to be obtained, the process according to the invention always requires less time than the earlier processes.

The description of this process points up its distinct advantages over earlier processes. It is an extremely simple implementation process. The method of operation obviates the use of either a methanolic or a hydromethanolic reaction medium. It further obviates the acidification of the reaction medium at the end of the reaction and the extraction of the dithiol formed by an organic solvent that is not miscible with methanol and water. The reaction times are far shorter than those described in U.S. Pat. 3,043,880. In this new process, the amounts of mercapto-alcohols formed are extremely small, in all cases under 2%. In addition, the recovery of the dithiol by simple decantation make it possible to eliminate these soluble mercapto-alcohols in the aqueous phase.

The α-dithiols to be obtained are ethane dithiol from 2-mercaptoethyl acetate, 1,2-propane dithiol from 1-methyl-2-mercaptoethyl acetate, propane trithiol either from 1-mercaptomethyl-2-mercaptoethyl acetate or from 1-chloromethyl-2-mercaptoethyl acetate; in the latter case, the substitution of the chlorine by an SH radical occurs during the sulphydrolysis reaction. These are compounds in which $R_1$, $R_2$, $R_3$ and $R_4$ can be replaced by H, $CH_3$, $CH_2SH$, or $CH_2Cl$.

The following examples illustrate the invention in a non-limitative way.

EXAMPLE 1

Into a 500 ml. autoclave are introduced 120 g. (1 mole) of 2-mercaptoethyl acetate and an aqueous solution of two moles of ammonium sulphydrate, obtained by saturating 140 ml. of concentrated aqueous ammonia with a stream of hydrogen sulphide. The autoclave is closed and the contents are stirred for three hours at a temperature of 80° C. The mixture is allowed to cool and the organic layer is decanted. The organic layer is then distilled, and 73 g. (0.78 mole) of 1,2-ethane dithiol are obtained, corresponding to a yield of 78% with respect to the 2-mercaptoethyl acetate used. The purity of the distilled dithiol ethane is 99%.

EXAMPLE 2

The same procedure as in Example 1 is followed, the ammonium sulphydrate being replaced by an aqueous solution of sodium sulphydrate. The yield of distilled ethane dithiol obtained is 76%.

EXAMPLE 3

Into a 5 liter autoclave are introduced 960 g. (8 moles) of 2-mercaptoethyl acetate and 1120 ml. of concentrated aqueous ammonia (d.=90). The autoclave is closed and 24 moles of liquid $H_2S$ are injected into it. The contents of the autoclave are stirred continuously and kept at 70° C. for three hours.

After cooling, the reaction mixture is decanted. 675 g. of organic layer are obtained. This organic layer is 95% pure 1,2-ethane dithiol (chromatographic analysis confirmed by distillation). This corresponds to a 1,2-ethane dithiol yield of 85% with respect to the starting 2-mercaptoethyl acetate. By extracting the aqueous layer with sulphuric ether, less than 1% ethane dithiol is recovered, proving that this recovery is of no interest economically speaking.

EXAMPLE 4

The same procedure as in Example 3 is followed, 10 moles of mercaptoethyl acetate and 1050 ml. of concentrated ammonium hydroxide being introduced into the autoclave and 20 moles of liquid $H_2S$ being injected. The 1,2-ethane dithiol yield is 81%.

EXAMPLE 5

Into a 500 ml. autoclave are introduced 134 g. (1 mole) of 1-methyl-2-mercaptoethyl acetate and 140 ml. of concentrated ammonium hydroxide, corresponding to the molar ratio $NH_4OH$/acetate=1:2. Then 2.5 moles of liquid $H_2S$ are added to the autoclave and the temperature is held at 100° C. for three hours. After decantation of the reaction mixture, 103 g. of an organic phase containing 1,2-propane dithiol in the amount of 90% are obtained. This corresponds to an 86% molar yield of 1,2-propane dithiol with respect to the starting acetate.

EXAMPLE 6

Into a 500 ml. autoclave are introduced 166 g. (1 mole) of 1-mercaptomethyl-2-mercaptoethyl acetate and 175 ml. of concentrated ammonium hydroxide. 3.5 moles of liquid $H_2S$ are then added to the autoclave and the temperature is held at 90° C. for three hours, with continuous stirring. After cooling and decantation, 125 g. of organic phase containing 1,2,3-propane trithiol in the amount of 90% are obtained. This corresponds to a molar yield of 80% with respect to the starting 1-methyl-2-mercaptoethyl acetate.

EXAMPLE 7

The compound obtained according to the process in Example 6 can also be obtained by using 1-chloromethyl-2-mercaptoethyl acetate as a starting material. The substitution of chlorine by an SH radical occurs during the sulphydrolysis reaction. The yield obtained is lower than in the preceding example, since it seems that the acetate has a tendency to hydrolyze to release the 3-chloro-2-hydroxypropanethiol which leads to the 1,3-dimercapto-2-propanol that is a by-product of the reaction.

Into the autoclave are introduced 101 g. (0.6 mole) of 1-chloromethyl-2-mercaptoethyl acetate and 168 ml. of concentrated ammonium hydroxide. 3.5 moles of liquid $H_2S$ are injected into the autoclave and the temperature is held at 100° C. for three hours.

There is a propane dithiol yield of 60% with respect to the starting acetate used. Concomitantly, with the propane trithiol, approximately 10% of 1,3-dimercapto-2-propanol is formed which is isolated by distillation.

What is claimed is:

1. A process for the preparation of α-dithiols of the formula:

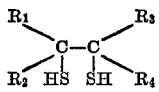

in which $R_1$, $R_2$, $R_3$ and $R_4$ are identical or different and are hydrogen or alkyl or haloalkyl comprising reacting an ester of a 2-mercaptoalkyl compound of the formula

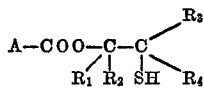

in which A is an aliphatic hydrocarbon radical containing one to six atoms of carbon and $R_1$ to $R_4$ are each hydrogen or alkyl or haloalkyl with an aqueous solution of an alkaline sulphydrate in the absence of an organic solvent at temperatures of between about 50° C. and 150° C. the molar ratio of said alkaline sulphydrate to said ester being greater than 1 and removing the resulting dithiol product.

2. A process according to claim 1 wherein said $R_1$, $R_2$, $R_3$, and $R_4$ are hydrogen or lower alkyl containing from 1 to 6 carbon atoms.

3. A process according to claim 2 wherein said alkaline sulphydrate to said 2-mercaptoalkyl ester is employed at a ratio of between about 1.4 and 4:1.

4. A process according to claim 3 wherein said alkaline sulphydrate to said 2-mercaptoalkyl ester is employed at a ratio of between about 2 and 3:1.

5. A process according to claim 1 wherein the reaction is conducted at a temperature between about 75° and 100° C.

6. A process according to claim 1 wherein said process is carried out in an autoclave at a temperature between about 75° C. and 100° C.

7. A process according to claim 1 wherein an excess of from 0.1% to 100% of $H_2S$ is used with respect to the quantity required for preparing alkaline sulphydrate from the basic hydroxide.

8. A process according to claim 1 wherein said 2-mercaptoalkyl ester is 2-mercaptoethyl acetate, and the dithiol product is 1,2-ethanedithiol.

9. A process according to claim 1 wherein said 2-mercaptoalkyl ester is 1-methyl-2-mercaptoethyl acetate and the dithiol product is 1,2-propane dithiol.

10. A process according to claim 1 wherein said 2-mercaptoethyl ester is 1-mercaptomethyl-2-mercaptoethyl acetate.

References Cited
FOREIGN PATENTS 1,493,141  1/1969  Germany _____ 260—609 R

OTHER REFERENCES

Auger et al.: Chimie Organique, vol. 19, 1963.

Baumann: Reaction of Sodium Mercaptides and Sodium Hydrosulfides With Esters, dissertation.

LEWIS GOTTS, Primary Examiner

D. R. PHILLIPS, Assistant Examiner

U.S. Cl. X.R.

260—455 R